United States Patent
Murata

(10) Patent No.: US 10,024,386 B2
(45) Date of Patent: Jul. 17, 2018

(54) DAMPER

(71) Applicant: HONDA MOTOR CO., LTD., Tokyo (JP)

(72) Inventor: Toshiki Murata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/255,405

(22) Filed: Sep. 2, 2016

(65) Prior Publication Data

US 2017/0067532 A1    Mar. 9, 2017

(30) Foreign Application Priority Data

Sep. 3, 2015  (JP) .................................. 2015-173989

(51) Int. Cl.
*F16F 15/12* (2006.01)
*F16F 15/134* (2006.01)

(52) U.S. Cl.
CPC ...... *F16F 15/13453* (2013.01); *F16F 15/134* (2013.01); *F16F 2232/02* (2013.01)

(58) Field of Classification Search
CPC ................. F16F 15/10; F16F 15/12333; F16F 15/12326; F16F 15/133; F16F 15/134; F16F 15/13407; F16F 15/13415; F16F 15/13423; F16F 15/1343; F16F 15/13438; F16F 15/13453; F16F 15/13469; F16F 15/30; F16F 15/315; F16F 15/13476; F16F 15/13484; F16F 15/1414; F16F 15/1421; F16F 2232/02
See application file for complete search history.

(56) References Cited

U.S. PATENT DOCUMENTS

| | | | | |
|---|---|---|---|---|
| 4,406,121 | A * | 9/1983 | Pelto ..................... | F03D 9/00 415/199.6 |
| 5,218,884 | A * | 6/1993 | Rohrle ............. | F16F 15/13438 192/205 |
| 6,461,243 | B1 * | 10/2002 | Uehara ............ | F16F 15/12326 192/205 |
| 6,575,838 | B2 * | 6/2003 | Jackel ................ | F16F 15/1343 192/205 |

(Continued)

FOREIGN PATENT DOCUMENTS

JP   2009-228736 A   10/2009
WO   WO 2010/010896 A1   1/2010

*Primary Examiner* — Adam D Rogers
(74) *Attorney, Agent, or Firm* — Squire Patton Boggs (US) LLP

(57) ABSTRACT

A damper comprised of a first rotary member; a second rotary member; at least one elastic member that transmits torque between the first rotary member and the second rotary member; a first seat member disposed between the elastic member, and a first abutment portion of the first rotary member and a second abutment portion of the second rotary member on a counter-rotating direction side of the first rotary member; a second seat member disposed between the elastic member, and the first abutment portion and the second abutment portion on a rotating direction side of the first rotary member; and a sticking preventing mechanism, which converts part of a radially outward force generated by a centrifugal force into a restoring force of the elastic member in the circumferential direction.

3 Claims, 13 Drawing Sheets

(56) References Cited

U.S. PATENT DOCUMENTS

| | | | | |
|---|---|---|---|---|
| 7,484,434 | B2* | 2/2009 | Jung | F16F 15/13438 |
| | | | | 74/574.4 |
| 8,376,864 | B2* | 2/2013 | Yamamoto | F16F 15/1392 |
| | | | | 464/68.1 |
| 8,568,243 | B2* | 10/2013 | Yamamoto | F16F 15/1343 |
| | | | | 464/68.92 |
| 8,641,537 | B2* | 2/2014 | Uehara | F16F 15/13469 |
| | | | | 464/68.92 |
| 8,840,481 | B2* | 9/2014 | Yamamoto | F16F 15/134 |
| | | | | 464/68.41 |
| 9,371,886 | B2* | 6/2016 | Yoon | F16F 15/13469 |
| 9,400,031 | B2* | 7/2016 | Uehara | F16F 15/13492 |
| 9,638,282 | B2* | 5/2017 | Kawazoe | F16F 15/13484 |
| 9,702,431 | B2* | 7/2017 | Kawazoe | F16F 15/13484 |
| 2011/0081977 | A1 | 4/2011 | Yamamoto et al. | |
| 2017/0122402 | A1* | 5/2017 | Murata | F16F 15/1232 |

* cited by examiner

DAMPER

CROSS-REFERENCE TO RELATED APPLICATION(S)

This application claims priority from Japanese Patent Application No. 2015-173989 filed on Sep. 3, 2015, the entire contents of which are incorporated herein by reference.

FIELD

The present invention relates to a damper that reduces torsional vibration on a torque transmission path.

BACKGROUND

There are known dampers that are interposed on a torque transmission path that transmits torque of an engine to reduce torsional vibration that is contained in torque transmitted. Dampers of this type include not only a clutch damper that functions as not only a damper but also a clutch (refer to JP-A-2009-228736, for example) but also a dual mass flywheel that includes a damper and two flywheels (refer to International Publication No. 2010/010896, for example), in addition to a single function damper that functions only as a damper.

FIGS. 8 to 11 show a conventional dual mass flywheel 1P, and this dual mass flywheel 1P includes a first flywheel 2, a second flywheel 3, coils springs 4 and spring seats 5.

The first flywheel 2 is a rotary member that is fixed to a crankshaft (not shown) of an engine via bolts B and includes a flywheel portion 21, a seal plate 22, a hub 23, a bearing support plate 24 and a ring gear 25.

The flywheel portion 21 has a disc-shaped inner circumferential wheel portion 21a, two first protuberant portions 21b that are formed along a circumferential direction on an outer circumferential side of the inner circumferential wheel portion 21a, two first non-protuberant portions 21c that are formed on the outer circumferential side of the inner circumferential wheel portion 21a so as to be positioned between the two first protuberant portions 21b in the circumferential direction, and a cylindrical portion 21d that is provided so as to extend in an axial direction from an outer circumferential edge portion of the first protuberant portions 21b and the first non-protuberant portions 21c. The first protuberant portions 21b protrude further outwards than the inner circumferential wheel portion 21a and the first non-protuberant portions 21c, and accommodation spaces S for the coil springs 4 and the spring seats 5 are defined inside the first protuberant portions 21b.

The seal plate 22 has an inner circumferential plate portion 22a, two second protuberant portions 22b that are formed along a circumferential direction on an outer circumferential side of the inner circumferential plate portion 22a, two second non-protuberant portions 22c that are formed on an outer circumferential side of the inner circumferential plate portion 22a so as to be positioned between the two second protuberant portions 22b in the circumferential direction, and a fixed portion 22d that is fixed to a distal end of the cylindrical portion 21d on an outer circumferential side of the second protuberant portions 22b and the second non-protuberant portions 22c. The second protuberant portions 22b protrude further outwards than the inner circumferential plate portion 22a and the second non-protuberant portions 22c, and the accommodation spaces S are defined inside the second protuberant portions 22b.

The hub 23 is a cylindrical member that is fixed to a central portion of the flywheel 21 and is fixed to the crankshaft together with the flywheel portion 21 with the bolts B. In addition, a bearing 27 is fitted on an outer circumferential portion of the hub 23, and the second flywheel 3 is supported rotatably on the first flywheel 2 via the bearing 27.

The bearing support plate 24 is a member that restricts an axial movement of the bearing 27 and is fixed to the crankshaft together with the flywheel portion 21 and the hub 23 with the bolts B. The ring gear 25 is a ring-shaped gear member that is fixed to an outer circumferential portion of the cylindrical portion 21d. When the engine is started, the ring gear 25 meshes with an output gear (not shown) of a starter motor to transmit engine starting torque to the crankshaft via the first flywheel 2.

The two accommodation spaces S are defined in the circumferential direction in the interior of the first flywheel 2. Each accommodation space S is a space extending along the circumferential direction which is surrounded by the first protuberant portion 21b, the second protuberant portion 22b and the cylindrical portion 21d, and both circumferential end positions thereof are defined by the first non-protuberant portion 21c and the second non-protuberant portion 22c. A first abutment portion 26, which is formed by a step portion that connects the first protuberant portion 21b and the first non-protuberant portion 21c together and a step portion that connects the second protuberant portion 22b and the second non-protuberant portion 22c together, is provided at each end of each accommodation space S.

The second flywheel 3 is a rotary member that is fixed to a transmission (not shown) and has a driven plate 31 that is disposed in the interior of the first flywheel 2 and a flywheel portion 32 that is disposed outside the first flywheel 2. The driven plate 31 and the flywheel portion 32 are connected together with a plurality of rivets 33 and supports rotatably the first flywheel 2 via the bearing 27.

The driven plate 31 has a disc portion 31a and two extended portions 31b that are extended radially outwards from an outer circumferential portion of the disc portion 31a. The disc portion 31a is disposed further radially inwards than the accommodation spaces S in the interior of the first flywheel 2, and the two extended portions 31b are extended from an outer circumferential portion of the disc portion 31a towards the interiors of the accommodation spaces S. The two extended portions 31b are formed so that their positions are offset 180° in the circumferential direction, and a second abutment portion 36 is formed at both circumferential end portions of each extended portion 31b which extends radially and axially and which is at right angles to the circumferential direction.

The coil springs 4 are arranged with a posture in which they follow the circumferential direction in the accommodation spaces S to transmit torque between the first flywheel 2 and the second flywheel 3. The spring seats 5 are disposed between the coil springs 4 and the first abutment portions 26 or the second abutment portions 36 on both sides of a rotational direction of the first flywheel 2 and slide on an inner circumferential surface 21e of the cylindrical portion 21d as the first flywheel 2 and the second flywheel 3 rotate relatively.

As shown in FIG. 11, in the dual mass flywheel 1P in an initial state, the spring seats 5 on both the sides of the rotational direction of the first flywheel 2 are in elastic abutment with the first abutment portions 26 and the second abutment portions 36. As shown in FIG. 12, when the vehicle is decelerated, although the first flywheel 2 rotates in a counterclockwise direction (refer to an arrow in the figure), since the rotation speed of the second flywheel 3 that is connected to the transmission is relatively faster than the rotation speed of the first flywheel 2 that is connected to the engine, the second abutment portion 36 of the second flywheel 3 that is positioned on a counter-rotating direction side relative to the coil spring 4 (a right side in the case of the coil spring 4 that is positioned at an upper part of the figure) presses the first abutment portion 26 of the first flywheel 2 that is positioned on a rotating direction side relative to the coil spring 4 (a left side in the case of the coil spring 4 that is positioned at the upper part of the figure) via the spring seats 5 and the coil springs 4, whereby torque is transmitted from the second flywheel 3 to the first flywheel 2. In FIGS. 12, 13 and other figures (FIGS. 2 to 5), relative positions of the first flywheel 2 and the second flywheel 3 are shown. When torque is so transmitted, the coil springs 4 are expanded or contracted in response to fluctuation in torque transmitted, whereby torsional vibration contained in the torque transmitted is reduced.

In this type of dual mass flywheel 1P, however, there may be occurring a phenomenon in which the spring seats 5 are caused to stick to the inner circumferential surface 21e of the first flywheel 2 by centrifugal force. When the vehicle is accelerated from the state shown in FIG. 12 in which the vehicle is decelerated, the first flywheel 2 is caused to rotate relatively faster than the second flywheel 3. Consequently, the first abutment portion 26 of the first flywheel 2 that is positioned on the counter-rotating direction side relative to the coil spring 4 (the right side in the case of the coil spring 4 that is positioned on the upper part in the figure) passes the second abutment portion 36 of the second flywheel 3, and the first abutment portion 26 of the first flywheel 2 starts to press the second abutment portion 36 of the second flywheel 3 that is positioned on the rotating direction side (the left side in the case of the coil spring 4 that is positioned at the upper part of the figure) via the spring seats 5 and the coil springs 4.

When the vehicle's state is shifted from the decelerated state to the accelerated state, as shown in FIG. 13, in case the spring seat 5 sticks to the inner circumferential surface 21e of the first flywheel 2, a clearance D is generated between the spring seat 5 that is positioned at the counter-rotating direction side end portion and the second abutment portion 36 of the second flywheel 3 that is positioned on the counter-rotating direction side, and there are fears that an impact generated in eliminating the clearance D represents a cause for generation of abnormal noise and vibration. Namely, when the vehicle's state is shifted from the decelerated state to the accelerated state, it should be natural that the spring seat 5 on the counter-rotating direction side slides over the inner circumferential surface 21e of the first flywheel 2 to be brought into abutment with the second abutment portion 36 of the second flywheel 3 and that with the spring seat 5 kept in abutment with the second abutment portion 36 of the second flywheel 3, the first abutment portion 26 of the first flywheel 2 passes the second abutment portion 36 of the second flywheel 3 and is then brought into abutment with the second abutment portion 36 of the second flywheel 3 to thereby be pressed. However, due to sticking to the inner circumferential surface 21e of the first flywheel 2, the first abutment portion 26 of the first flywheel 2 does not follow the second abutment portion 36 of the second flywheel 3 (a distance L in FIG. 12 is maintained), and the clearance D is generated between the first abutment portion 26 and the second abutment portion 36 when the first abutment portion 26 of the first flywheel 2 passes the second abutment portion 36 of the second flywheel 3.

In particular, in the dual mass flywheel 1P that can ensure a good vibration reduction performance over a wide torque fluctuation range from low torque to high torque, three or more coil springs 4 are disposed in series in each accommodation space S, and the spring constant of the coil springs 4 that are positioned at the circumferential ends is set smaller than the spring constant of the remaining coil spring 4, this facilitating the generation of a sticking phenomenon of the spring seats 5.

SUMMARY

An object of the invention is to provide a damper that can prevent the generation of a sticking phenomenon of spring seats that would otherwise be caused by centrifugal force.

The invention provides following Aspects 1 to 5.

1. A damper (e.g., dual mass flywheels 1A, 1B in embodiment) including:

a first rotary member (e.g., a first flywheel 2 in embodiment), which has a side plate (e.g., a flywheel portion 21 in embodiment) having a disc-shape, a cylindrical portion (e.g., a cylindrical portion 21d in embodiment) that is extended in an axial direction from an outer circumferential edge portion of the side plate, and first abutment portions (e.g., first abutment portions 26 in embodiment) that are provided apart from each other in a circumferential direction;

a second rotary member (e.g., a second flywheel 3 in embodiment), which has second abutment portions (e.g., second abutment portions 36 in embodiment) that are provided apart from each other in the circumferential direction, and which is disposed rotatably relative to the first rotary member;

at least one elastic member (e.g., coil springs 4 in embodiment) that transmits torque between the first rotary member and the second rotary member;

a first seat member (e.g., a first spring seat 51 in embodiment), which is disposed between the elastic member, and the first abutment portion and the second abutment portion on a counter-rotating direction side of the first rotary member, and which is configured to slide on an inner circumferential surface (e.g., an inner circumferential surface 21e in embodiment) of the cylindrical portion as the first rotary member and the second rotary member rotate relatively;

a second seat member (e.g., a second spring seat 52 in embodiment), which is disposed between the elastic member, and the first abutment portion and the second abutment portion on a rotating direction side of the first rotary member, and which is configured to slide on the inner circumferential surface of the cylindrical portion as the first rotary member and the second rotary member rotate relatively; and a sticking preventing mechanism (e.g., a sticking preventing mechanism TF in embodiment), which converts part of a radially outward force generated by a centrifugal force into a restoring force of the elastic member in the circumferential direction to thereby prevent sticking of the first seat member and the second seat member to the inner circumferential surface.

2. The damper of Aspect 1, wherein:

the elastic member includes three or more coil springs (e.g., a first to fourth coil springs 41 to 44 in embodiment) that are disposed in series along the circumferential direction;

a third seat member (e.g., third to fifth spring seats 53 to 55 in embodiment) is provided between the coil springs that lie adjacent to each other in the circumferential direction, the third seat member being configured to slide on the inner circumferential surface of the cylindrical portion as the first rotary member and the second rotary member rotate relatively; and a spring constant of the coil springs that are positioned at circumferential ends is smaller than a spring constant of an other coil spring.

3. The damper of Aspect 1 or 2, the damper, wherein the sticking preventing mechanism is made up of a first diametrically expanded surface (e.g., a first diametrically expanded surface 21f in embodiment) in which at least a portion of the inner circumferential surface of the cylindrical portion where the first seat member slides is expanded diametrically towards the counter-rotating direction side, and a second diametrically expanded surface (e.g., a second diametrically expanded surface 21g in embodiment) in which at least a portion of the inner circumferential surface of the cylindrical portion where the second seat member slides is expanded diametrically towards the rotating direction side.

4. The damper of Aspect 3, wherein a forming range (e.g., a forming range L2 in embodiment) of the second diametrically expanded surface is wider than a forming range (e.g., a forming range L1 of the embodiments) of the first diametrically expanded surface.

5. The damper of Aspect 1 or 2, wherein:

the sticking preventing mechanism includes: inclined portions (e.g., inclined portions 51c, 52c in embodiment) that are formed on the first seat member and the second seat member; and guide members (e.g., a guide member 6 in embodiment) that are disposed individually between the inclined portions and the elastic members; and the guide members can not only be brought into engagement with the elastic members but also slide radially outwards along the inclined portions by the centrifugal force and increase reaction forces of the elastic members by sliding.

According to Aspect 1, since the damper includes the sticking preventing mechanism that converts part of a radially outward force generated by a centrifugal force into a restoring force of the elastic member in the circumferential direction to thereby prevent the sticking of the first seat member and the second seat member to the inner circumferential surface, it is possible to prevent the generation of a clearance that would otherwise be caused by the sticking of the first seat member and the second seat member and the generation of abnormal noise and vibration that would otherwise be produced by the clearance.

According to Aspect 2, the elastic member includes the three or more coil springs that are disposed in series along the circumferential direction, and the spring constant of the coil springs that are positioned at the circumferential ends is smaller than the spring constant of the other coil spring. Thus, it is possible to obtain a good vibration reducing performance over a wide torque fluctuation range from low torque to high torque. In addition, even though the spring constant is reduced, the sticking of the seat members is restricted by the sticking preventing mechanism, and therefore, it is also possible to prevent the generation of abnormal noise and vibration that are attributed to the presence of the clearance.

According to Aspect 3, the sticking preventing mechanism is made up of the first diametrically expanded surface in which at least the portion of the inner circumferential surface of the cylindrical portion where the first seat member slides is expanded diametrically towards the counter-rotating direction side, and the second diametrically expanded surface in which at least the portion of the inner circumferential surface of the cylindrical portion where the second seat member slides is expanded diametrically towards the rotating direction side. Thus, the sticking preventing mechanism converts part of a radially outward force generated by a centrifugal force into the restoring force of the elastic member in the circumferential direction by the first diametrically expanded surface and the second diametrically expanded surface to thereby prevent the sticking of the first seat member and the second seat member to the inner circumferential surface.

According to Aspect 4, since in general, maximum torque at the time of acceleration is greater than maximum torque at the time of deceleration, the sticking preventing effect of the seat members can be improved by making the forming range of the second diametrically expanded surface wider than the forming range of the first diametrically expanded surface.

According to Aspect 5, the sticking preventing mechanism includes the inclined portions that are formed on the first seat member and the second seat member, and the guide members that are disposed individually between the inclined portions and the elastic members, and the guide members can restrict the sticking of the first seat member and the second seat member to the inner circumferential surface by converting part of the centrifugal force into the force with which the reaction forces of the elastic members are increased.

DETAILED DESCRIPTION

Figure 8:
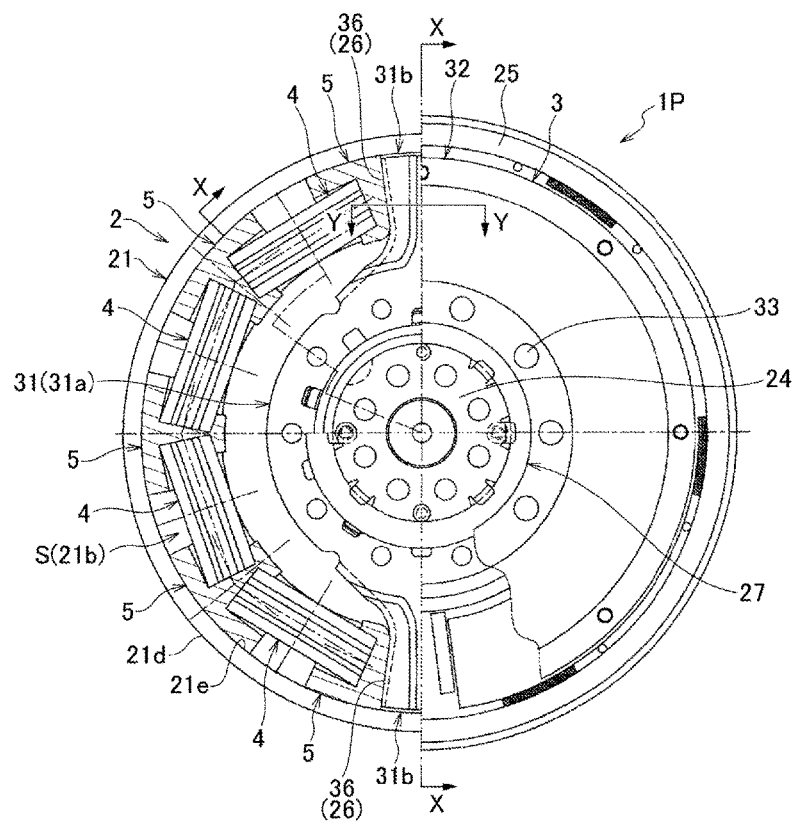
FIG. 8 is a partially cutaway front view of a conventional dual mass flywheel.

Hereinafter, embodiments of dampers of the invention will be described based on the accompanying drawings. The dampers in the embodiments are similar to a conventional dual mass flywheel 1P except for a sticking preventing mechanism, and therefore, like reference numerals to those of the conventional dual mass flywheel will be given to configurations which are common to both, and the description will be made while referring also to FIGS. 8 and 9. In FIGS. 1 to 6, some configurations of a dual mass flywheel will be simplified.

<First Embodiment>

Firstly, a dual mass flywheel 1A of a first embodiment of the invention will be described by reference to FIGS. 1 to 5, 9 and 10.

Figure 1:
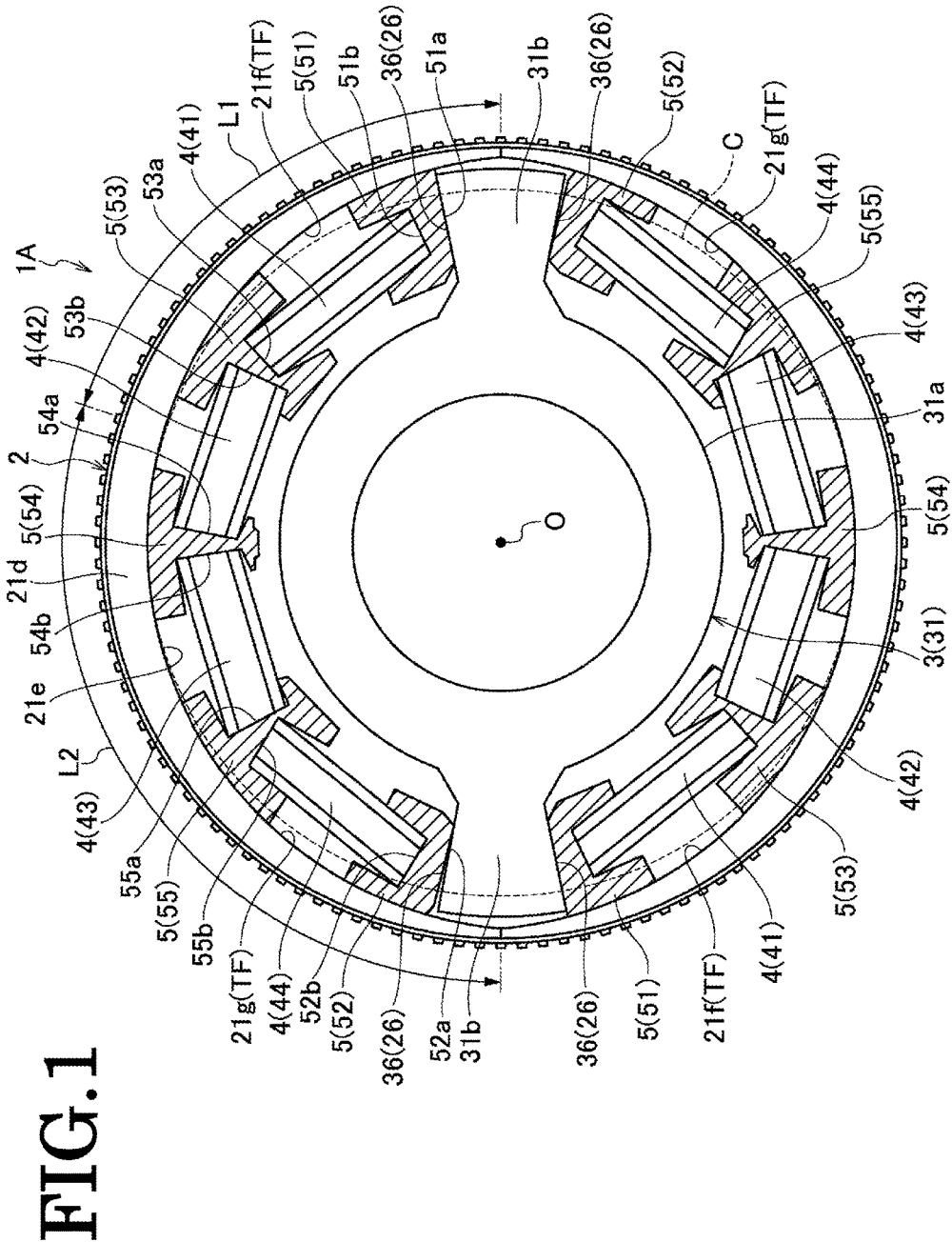
FIG. 1 is a front view of an interior of a dual mass flywheel according to a first embodiment of the invention which shows an initial state of the dual mass flywheel.
Figure 9:
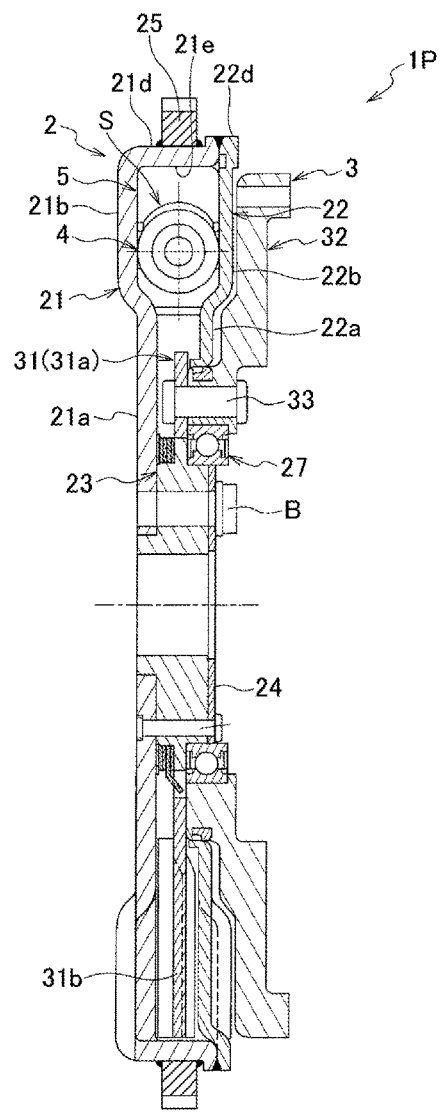
FIG. 9 is a sectional view taken along a line X-X in FIG. 8.
Figure 10:
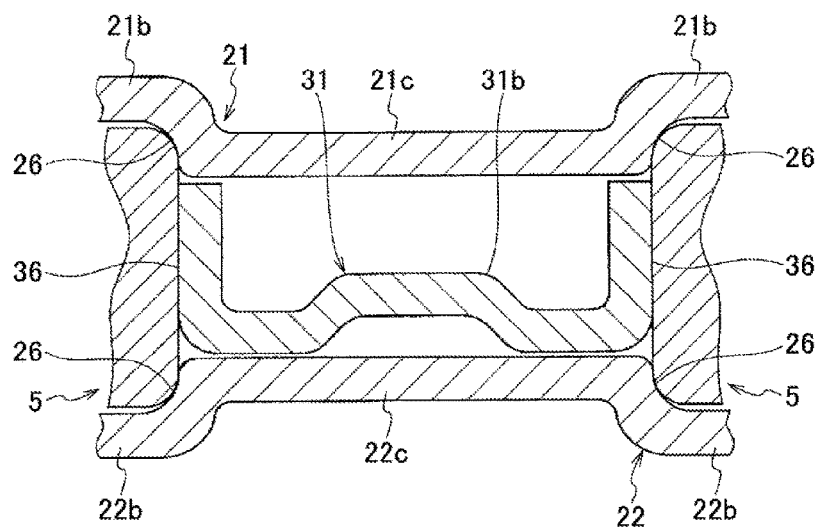
FIG. 10 is a sectional view taken along a line Y-Y in FIG. 8.
Figure 11:
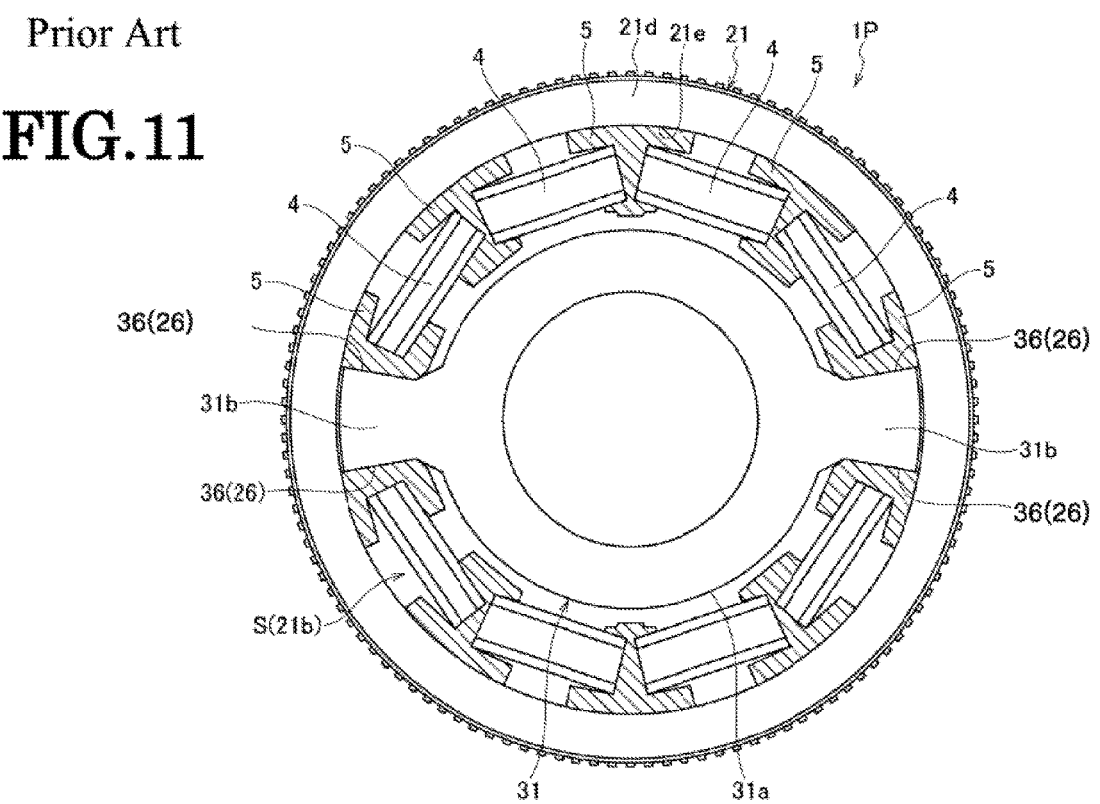
FIG. 11 is a front view of an interior of the conventional dual mass flywheel which shows an initial state of the dual mass flywheel.
Figure 12:
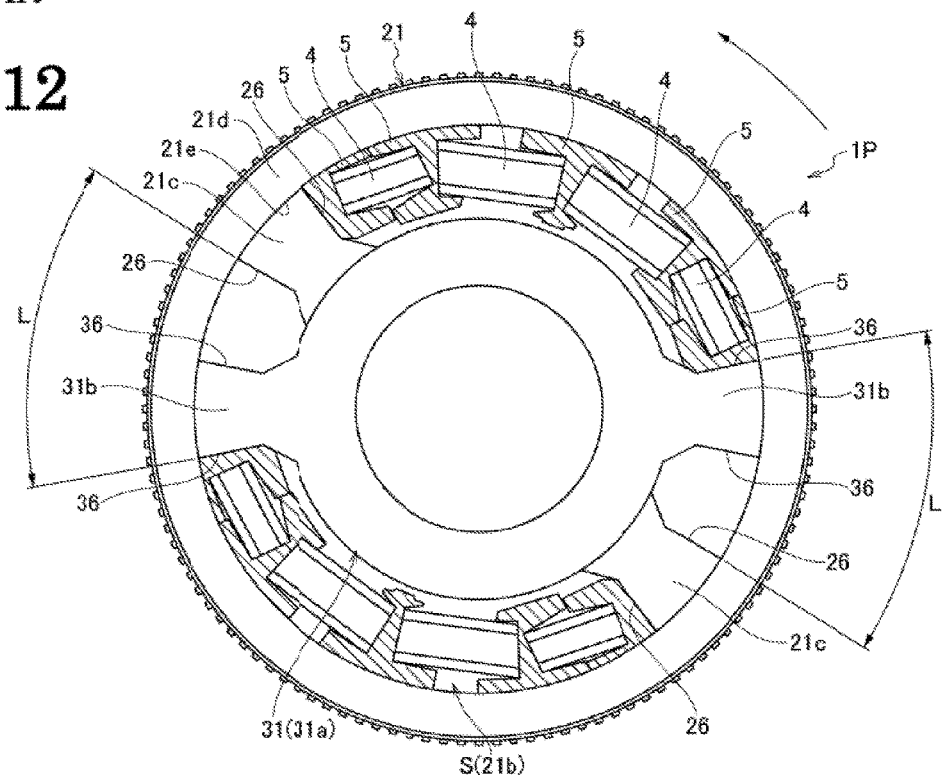
FIG. 12 is a front view of the interior of the conventional dual mass flywheel which shows relative positions at the time of deceleration.
Figure 13:
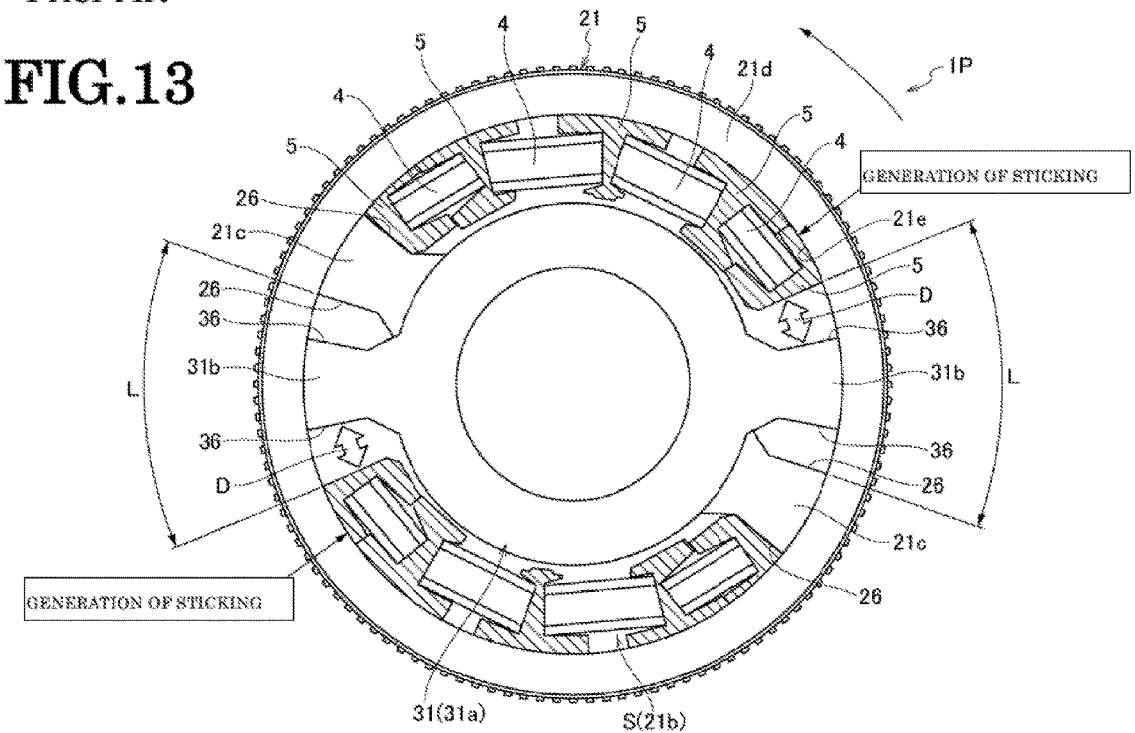
FIG. 13 is a front view of the interior of the conventional dual mass flywheel which shows relative positions at the time of shifting from deceleration to acceleration.

As shown in FIGS. 1, 9 and 10, the dual mass flywheel 1A of the first embodiment is a device that is interposed on a torque transmission path of an engine (not shown) to function as a damper and a flywheel and includes a first flywheel 2, a second flywheel 3, coil springs 4 and spring seats 5.

The first flywheel 2 is a rotary member that is fixed to a crankshaft (not shown) of the engine and has a disc-shaped flywheel portion 21 that covers one side surface of the flywheel 2 and a seal plate 22 that covers the other side surface thereof. In the following description, it is understood that the first flywheel 2 rotates in a counterclockwise direction. The flywheel portion 21 has a disc-shaped inner circumferential wheel portion 21a that makes up a central portion thereof, two first protuberant portions 21b that are formed along a circumferential direction on an outer circumferential side of the inner circumferential wheel portion 21a, two first non-protuberant portions 21c that are formed on the outer circumferential side of the inner circumferential wheel portion 21a so as to be positioned between the two first protuberant portions 21b in the circumferential direction, and a cylindrical portion 21d that is provided so as to extend in an axial direction from an outer circumferential edge portion of the first protuberant portions 21b and the first non-protuberant portions 21c. The first protuberant portions 21b protrude further outwards than the inner circumferential wheel portion 21a and the first non-protuberant portions 21c, and accommodation spaces S for the coil springs 4 and the spring seats 5 are defined inside the first protuberant portions 21b. Second protuberant portions 22b and second non-protuberant portions 22c are also formed on the seal plate 22, and the second protuberant portions 22b and the second non-protuberant portions 22c are symmetrical in shape with the first protuberant portions 21b and the first non-protuberant portions 21c, respectively.

Two accommodation spaces S are defined in an interior of the first flywheel 2. Each accommodation space S is a space extending along the circumferential direction which is surrounded by the first protuberant portion 21b, the second protuberant portion 22b and the cylindrical portion 21d, and both circumferential end positions thereof are defined by the first non-protuberant portion 21c and the second non-protuberant portion 22c. A first abutment portion 26, which is formed by a step portion that connects from the first protuberant portion 21b to the first non-protuberant portion 21c and a step portion that connects from the second protuberant portion 22b to the second non-protuberant portion 22c, is provided at each end of each accommodation space S.

The cylindrical portion 21d of the flywheel portion 21 covers an outer circumferential side of the accommodation spaces S, and an inner circumferential surface 21e of the cylindrical portion 21d functions as a sliding guide surface that guides the spring seats 5 disposed in the accommodation spaces S so as to move freely in the circumferential direction in a sliding fashion. As shown in FIG. 1, sticking preventing mechanisms TF are provided on the inner circumferential surface 21e of the cylindrical portion 21d according to the first embodiment.

Figure 2:
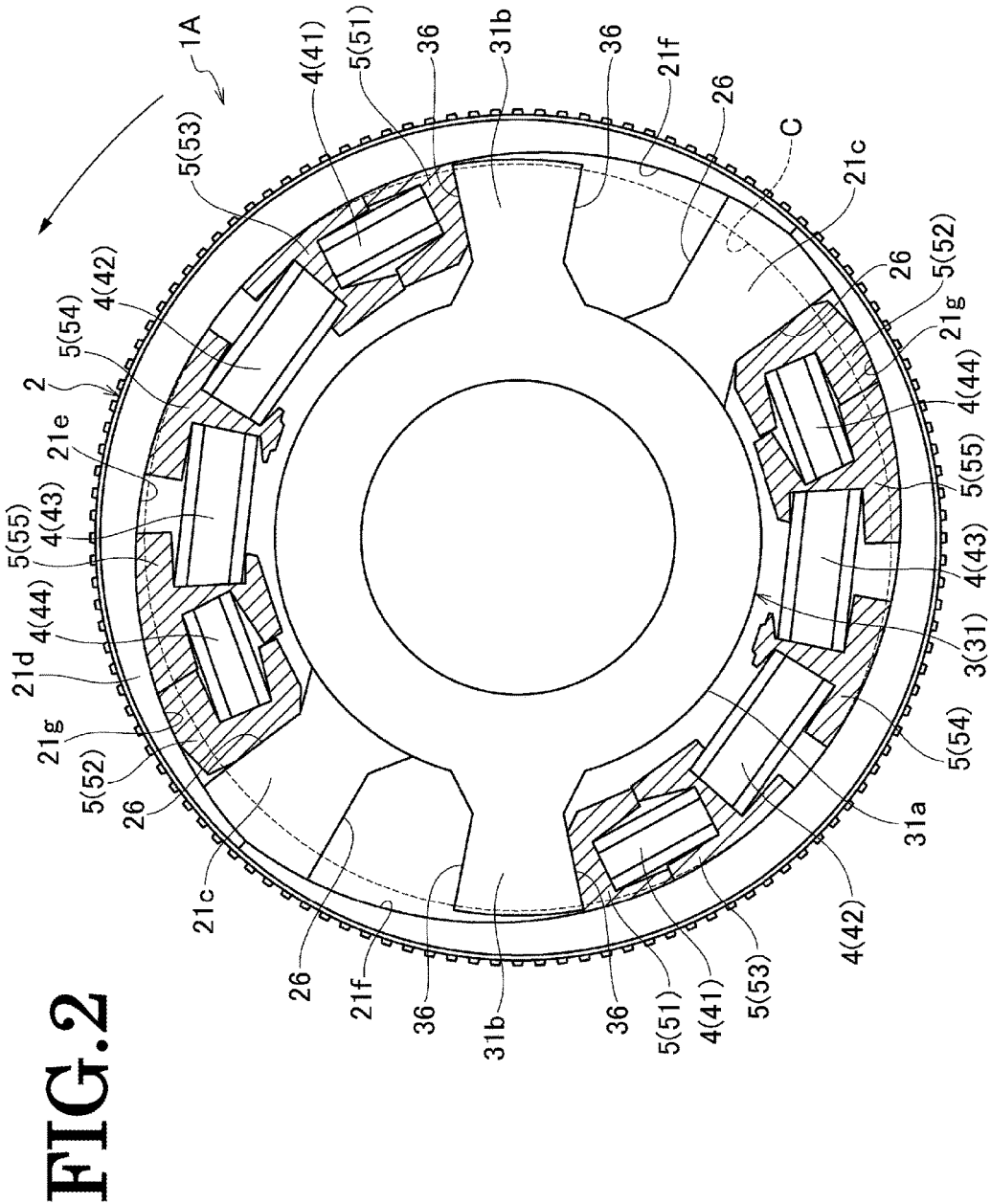
FIG. 2 is a front view of the interior of the dual mass flywheel according to the first embodiment of the invention which shows relative positions at the time of deceleration.
Figure 3:
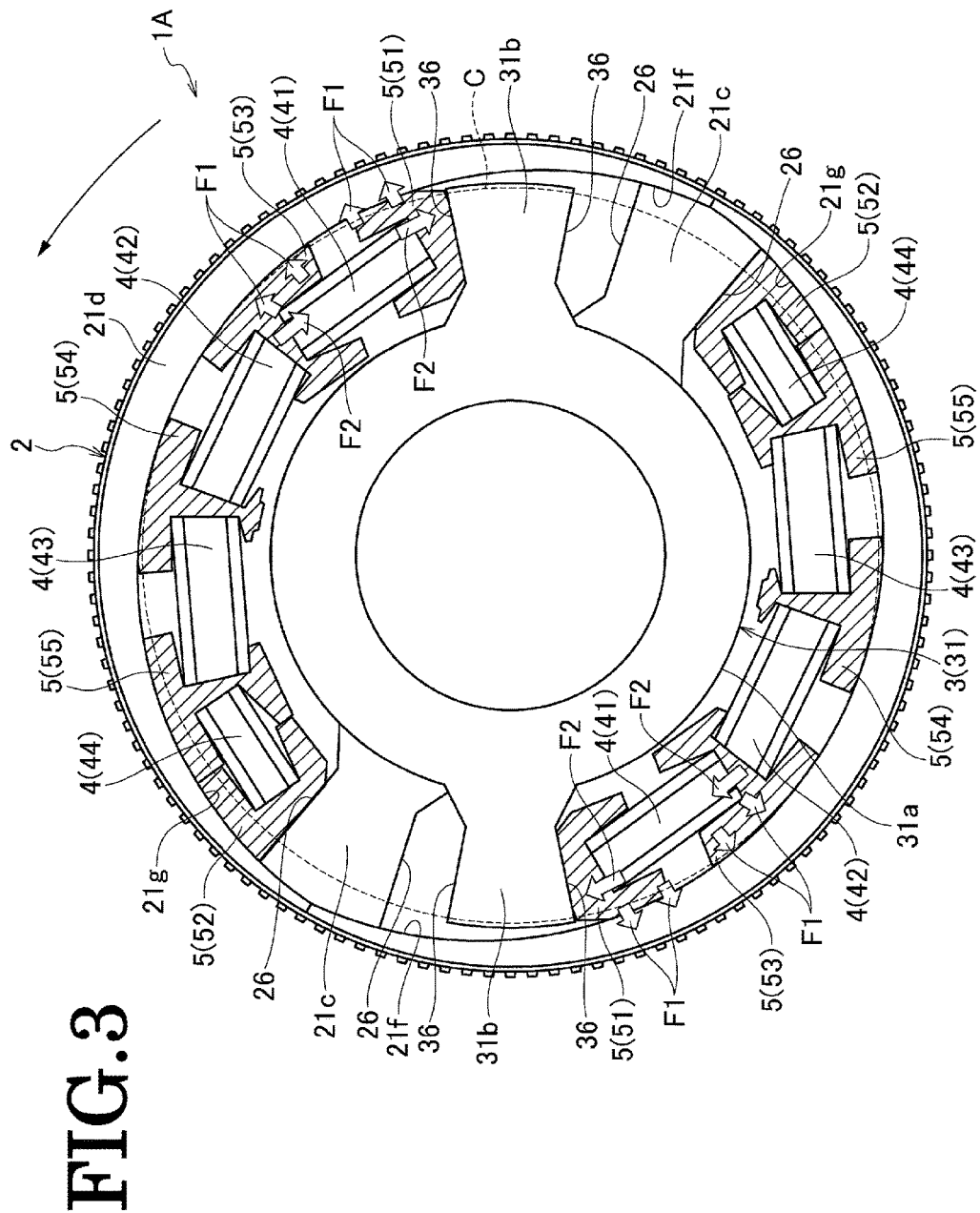
FIG. 3 is a front view of the interior of the dual mass flywheel according to the first embodiment of the invention which shows relative positions at the time of shifting from a decelerated state to an accelerated state.

The sticking preventing mechanisms TF each include a first diametrically expanded surface 21f that is formed by expanding the inner circumferential surface 21e of the cylindrical portion 21d gradually diametrically from a circumferential central portion of the accommodation space S towards a counter-rotating direction side of the first flywheel 2 and a second diametrically expanded surface 21g that is formed by expanding the inner circumferential surface 21e of the cylindrical portion 21d gradually diametrically from the circumferential central portion of the accommodation space S towards a rotating direction side of the first flywheel 2. In this embodiment, a forming range L2 of the second diametrically expanded surface 21g is wider than a forming range L1 of the first diametrically expanded surface 21f. In FIGS. 1 to 3, reference character C denotes an imaginary reference circle that is centered at a rotating axis O of the first flywheel 2 and whose radius is a minimum radius Rmin of the inner circumferential surface 21e, and the diametrically expanded states of the first diametrically expanded surface 21f and the second diametrically expanded surface 21g can be confirmed through comparison with the imaginary reference circle C.

Returning to FIGS. 9 and 10, the second flywheel 3 has a driven plate 31 that is disposed in an interior of the first flywheel 2 and a flywheel portion 32 that is disposed outside the first flywheel 2 and is supported rotatably on the first flywheel 2 via a bearing 27.

The driven plate 31 has a disc portion 31a and two extended portions 31b that are extended radially outwards from an outer circumferential portion of the disc portion 31a. The disc portion 31a is disposed further radially inwards than the accommodation spaces S in the interior of the first flywheel 2, and the two extended portions 31b are extended from an outer circumferential portion of the disc portion 31a towards the interiors of the accommodation spaces S. The two extended portions 31b are formed so that their positions are offset 180° in the circumferential direction, and a second abutment portion 36 is formed at each circumferential end portion of each extended portion 31b which extends radially and axially, and which is at right angles to the circumferential direction.

The coil springs 4 are arranged with a posture in which they follow the circumferential direction in the accommodation spaces S to transmit torque between the first flywheel 2 and the second flywheel 3. The coil springs 4 of this embodiment includes first to fourth coil springs 41 to 44 which are disposed in series along the circumferential direction in each accommodation space S, and a spring constant of the first and fourth coil springs 41, 44 which are positioned at circumferential ends is smaller than a spring constant of the second and third coil springs 42, 43 which are positioned circumferentially inside the first and fourth coil springs 41, 44, as shown in FIG. 1.

The spring seats 5 are disposed between the coil springs 4 and the abutment portions 26, 36 at least on a counter-rotating direction side and a rotating direction side of the first flywheel 2 on both sides of a rotational direction of the first flywheel 2 and slide on the inner circumferential surface 21e of the cylindrical portion 21d as the first flywheel 2 and the second flywheel 3 rotate relatively. The spring seats 5 of this embodiment include a first spring seat 51 that is disposed between the first coil spring 41 and the abutment portion 26, 36 on the counter-rotating direction side, a second spring seat 52 that is disposed between the fourth coil spring 44 and the abutment portion 26, 36 on the rotating direction side, a third spring seat 53 that is disposed between the first coil spring 41 and the second coil spring 43, a fourth spring seat 54 that is disposed between the second coil spring 42 and the third coil spring 43, and a fifth coil spring seat 55 that is disposed between the third coil spring 43 and the fourth coil spring 44.

The first spring seat 51 has an abutment surface 51a formed on a counter-rotating direction side end surface so as to be brought into abutment with the abutment portion 26, 36 and a recess portion 51b formed on a rotating direction side end face so that a counter-rotating direction side end portion of the first coil spring 41 fits therein. The second spring seat 52 has a recess portion 52b formed on a counter-rotating direction side end face so that a rotating direction side end portion of the fourth coil spring 44 fits therein and an abutment surface 52a formed on a rotating direction side end face so as to be brought into abutment with the abutment portion 26, 36. The third spring seat 53 has a recess portion 53a formed on a counter-rotating direction side end face so that a rotating direction side end portion of the first coil spring 41 fits therein and a recess portion 53b formed on a rotating direction side end face so that a counter-rotating direction side end portion of the second coil spring 42 fits therein. The fourth spring seat 54 has a recess portion 54a formed on a counter-rotating direction side end face so that a rotating direction side end portion of the second coil spring 42 fits therein and a recess portion 54b formed on a rotating direction side end face so that a counter-rotating direction side end portion of the third coil spring 43 fits therein. The fifth spring seat 55 has a recess portion 55a formed on a counter-rotating direction side end face so that a rotating direction side end portion of the third coil spring 43 fits therein and a recess portion 55b formed on a rotating direction side end face so that a counter-rotating direction side end portion of the fourth coil spring 44 fits therein.

[Operation]

Next, the operation of the dual mass flywheel 1A of the first embodiment of the invention will be described by reference to FIGS. 1 to 5.

As shown in FIG. 1, in the dual mass flywheel 1A in an initial state, the first and second spring seats 51, 52 that are positioned at the counter-rotating direction side end portion and at the rotating direction side end portion of the accommodation space S are in elastic abutment with the first abutment portions 26 and the second abutment portions 36. When the vehicle is decelerated, as shown in FIG. 2, although the first flywheel 2 is rotating in a counterclockwise direction (refer to an arrow in the figure), since the rotation speed of the second flywheel 3 is relatively faster than the rotation speed of the first flywheel 2 connected to the engine, the counter-rotating direction side second abutment portion 36 of the second flywheel 3 presses the rotating direction side first abutment portion 26 of the first flywheel 2 against the coil spring 4 via the spring seats 5 and the coil springs 4, whereby torque is transmitted from the second flywheel 3 to the first flywheel 2. When torque is so transmitted, the coil springs 4 are expanded or contracted in response to fluctuation in torque transmitted, whereby torsional vibration contained in the torque transmitted is reduced. Since the two types of coil springs 41 to 44 having the different spring constants are disposed in series in each accommodation space S, it is possible to obtain a good vibration reduction performance over a wide torque fluctuation range from low torque to high torque.

When the vehicle is accelerated from the state shown in FIG. 2 in which the vehicle is decelerated, the first flywheel 2 starts to rotate relatively faster than the second flywheel 3, and the counter-rotating direction side first abutment portion 26 of the first flywheel 2 presses the rotating direction side second abutment portion 36 of the second flywheel 3 against the coil spring 4 via the spring seats 5 and the coil springs 4.

When the vehicle's state is shifted from the decelerated state to the accelerated state, it is required that the first spring seat 51 that is positioned at the counter-rotating direction side end portion of the accommodation space S follows the the counter-rotating direction side second abutment portion 36 of the second flywheel 3 while sliding smoothly on the inner circumferential surface 21e of the first flywheel 2 and holds the abutment state with the second abutment portion 36 until the first spring seat 51 is brought into abutment with the first abutment portion 26. In this moment, since a great centrifugal force F1 is being applied to the first spring seat 51, the first spring seat 51 is caused to stick to the inner circumferential surface 21e of the first flywheel 2 by the centrifugal force F1, whereby there are caused fears that a clearance is generated between the first spring seat 51 and the rotating direction side first abutment portion 26 of the first flywheel 2.

As has been described above, the dual mass flywheel 1A of the invention includes the sticking preventing mechanisms TF which each convert part of a radially outward force generated by the centrifugal force F1 into a circumferential restoring force F2 of the coil spring 4 to thereby prevent the sticking of the spring seat 5 to the inner circumferential surface 21e of the first flywheel 2. To describe this specifically, the sticking preventing mechanism TF of the first embodiment includes the diametrically expanded surfaces that are formed by diametrically expanding the inner circumferential surface 21e of the first flywheel 2 from the circumferential central portion of the accommodation space S towards the rotating direction sides of the first flywheel 2, and the diametrically expanded surfaces convert part of the centrifugal force F1 applied to the spring seats 5 into the restoring force F2 of the coil springs 4, whereby the sticking of the spring seats 5 is prevented.

The diametrically expanded surfaces include the first diametrically expanded surface 21f that is formed by diametrically expanding the inner circumferential surface 21e of the first flywheel 2 from the circumferential central portion of the accommodation space S towards the counter-rotating direction side of the first flywheel 2 and the second diametrically expanded surface 21g that is formed by diametrically expanding the inner circumferential surface 21e of the first flywheel 2 from the circumferential central portion of the accommodation space S towards the rotating direction side of the first flywheel 2. As shown in FIG. 3, immediately after the vehicle's state is shifted from the decelerated state to the accelerated state, by converting part of the centrifugal force F1 applied to at least the first spring seat 51 and the third spring seat 53 which are positioned in the forming range L1 of the first diametrically expanded surface 21f into the restoring force F2 of the coil springs 4 by the first diametrically expanded surface 21f, the sticking of the first spring seat 51 and the third spring seat 53 to the inner circumferential surface 21e of the first flywheel 2 is prevented.

Figure 4:
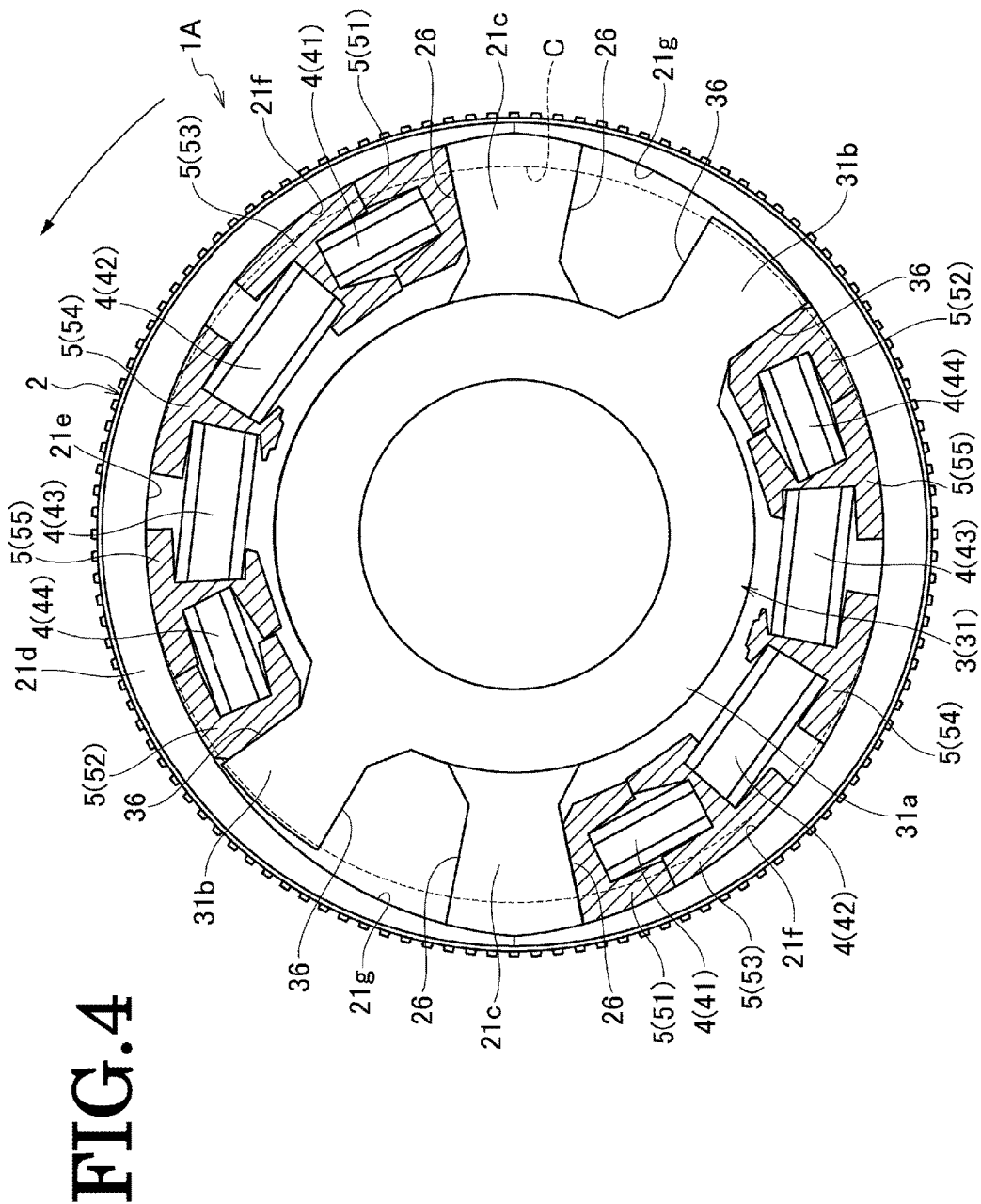
FIG. 4 is a front view of the interior of the dual mass flywheel according to the first embodiment of the invention which shows relative positions at a time of acceleration.
Figure 5:
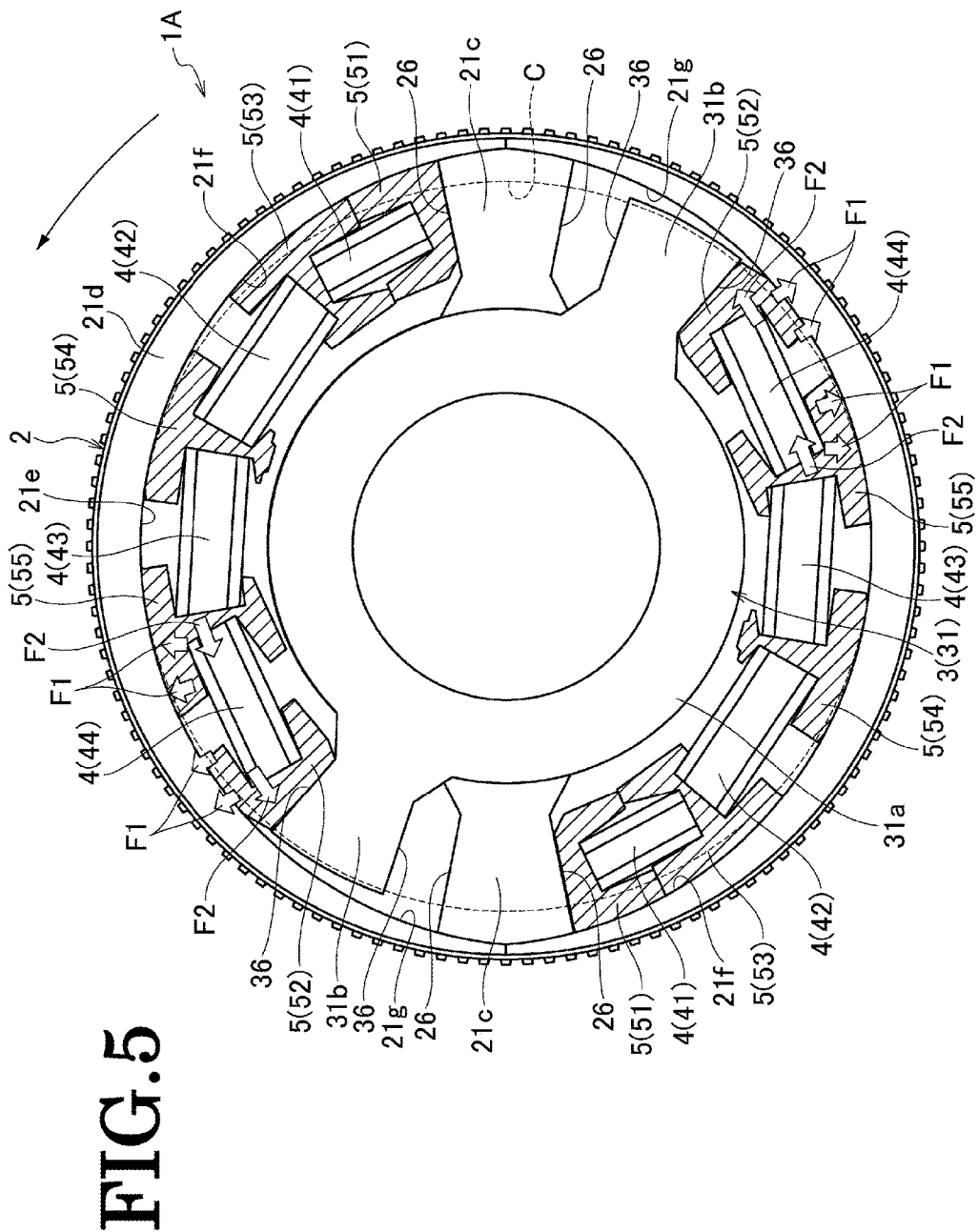
FIG. 5 is a front view of the interior of the dual mass flywheel according to the first embodiment of the invention which shows relative positions at the time of shifting from the accelerated state to the decelerated state.
Figure 6:
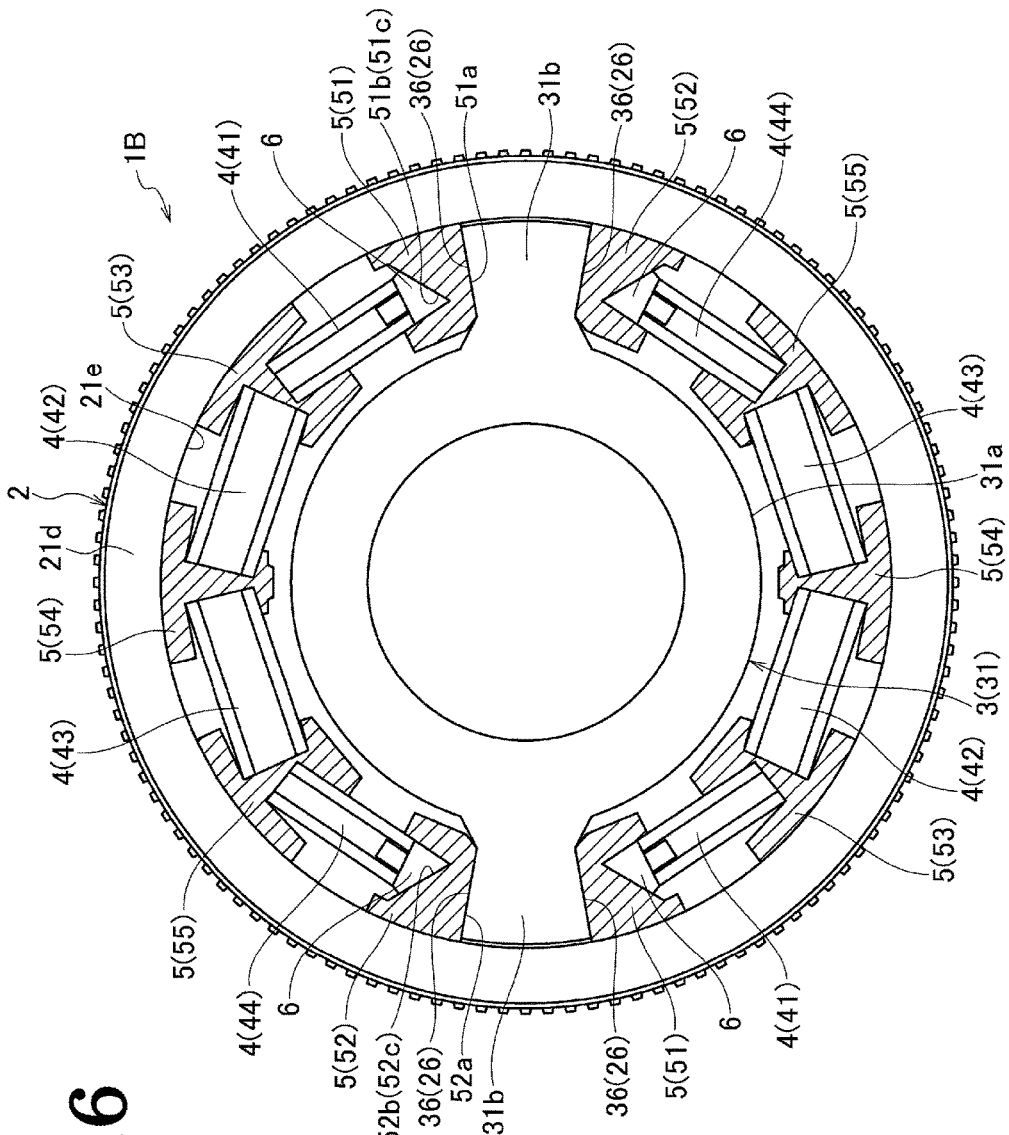
FIG. 6 is a front view of an interior of a dual mass flywheel according to a second embodiment of the invention which shows an initial state of the dual mass flywheel.

On the other hand, when the vehicle is accelerated, as shown in FIG. 4, since the first flywheel 2 rotates in the counterclockwise direction (refer to an arrow in the figure) and the rotation speed of the first flywheel 2 that is connected to the engine is relatively faster than the rotation speed of the second flywheel 3 that is connected to the transmission, the counter-rotating direction side first abutment portion 26 of the first flywheel 2 presses the rotating direction side second abutment portion 36 of the second flywheel 3 against the coil spring 4 via the spring seats 5 and the coil springs 4, whereby torque is transmitted from the first flywheel 2 to the second flywheel 3. When torque is so transmitted, the coil springs 4 are expanded or contracted in response to fluctuation in torque transmitted, whereby torsional vibration contained in the torque transmitted is reduced. Since the two types of coil springs 41 to 44 having the different spring constants are disposed in series in each accommodation space S, it is possible to obtain a good vibration reduction performance over a wide torque fluctuation range from low torque to high torque.

When the vehicle is decelerated from the state shown in FIG. 4 in which the vehicle is accelerated, the second flywheel 3 starts to rotate relatively faster than the first flywheel 2, and the counter-rotating direction side second abutment portion 36 of the second flywheel 3 presses the rotating direction side first abutment portion 26 of the first flywheel 2 against the coil spring 4 via the spring seats 5 and the coil springs 4.

When the vehicle's state is shifted from the accelerated state to the decelerated state, it is required that the second spring seat 52 that is positioned at the rotating direction side end portion of the accommodation space S follows the the rotating direction side second abutment portion 36 of the second flywheel 3 while sliding smoothly on the inner circumferential surface 21e of the first flywheel 2 and holds the abutment state with the second abutment portion 36 until the second spring seat 52 is brought into abutment with the first abutment portion 26. In this moment, since the great centrifugal force F1 is applied to the second spring seat 52, the second spring seat 52 is caused to stick to the inner circumferential surface 21e of the first flywheel 2 by the centrifugal force F1, whereby there are caused fears that a clearance is generated between the second spring seat 52 and the rotating direction side second abutment portion 36 of the second flywheel 3. However, by converting part of the centrifugal force F1 applied to at least the second spring seat 52 and the fifth spring seat 55 which are positioned in the forming range L2 of the second diametrically expanded surface 21g into the restoring force F2 of the coil springs 4 by the second diametrically expanded surface 21g, the sticking of the second spring seat 52 and the fifth spring seat 55 to the inner circumferential surface 21e of the first flywheel 2 is prevented.

Thus, as has been described heretofore, according to the dual mass flywheel 1A of this embodiment, since the dual mass flywheel 1A has the sticking preventing mechanisms TF which are each made up of the first diametrically expanded surface 21f and the second diametrically expanded surface which are formed by diametrically expanding the inner circumferential surface 21e of the first flywheel 2 from the circumferential central portion of the accommodation space S towards both the sides thereof, part of the centrifugal force F1 applied to the spring seats 5 is converted into the restoring force F2 of the coil springs 4 by the first diametrically expanded surface 21f and the second diametrically expanded surface 21g to thereby prevent the sticking of the spring seats 5 to the inner circumferential surface 21e of the first flywheel 2.

In addition, since the first diametrically expanded surface 21f and the second diametrically expanded surface substantially increase the reaction force of the coil springs 4 by converting part of the centrifugal force F1 applied to the spring seats 5 into the restoring force F2 of the coil springs 4, the spring constants of the coil springs 4 can be reduced, as a result of which it is possible not only to eliminate a resonance failure by reducing the resonance frequency but also to reduce the weight and production cost of the coil springs 4.

<Second Embodiment>

Next, a dual mass flywheel 1B according to a second embodiment of the invention will be described by reference to FIGS. 6 and 7(a)-7(c). However, like reference numerals to those of the first embodiment will be given to configurations common to the first embodiment, whereby the description of the first embodiment will be used.

As shown in FIGS. 6 and 7(a)-7(c), the dual mass flywheel 1B according to the second embodiment of the invention differs from the first embodiment in that a sticking preventing mechanism TF converts part of a centrifugal force F3 applied to the coil springs 4 into a force F4 which increases a reaction force of the coil springs 4. To describe this specifically, the sticking preventing mechanism TF of the second embodiment includes inclined portions 51c, 52c which are formed on a first spring seat 51 and a second spring seat 52, respectively, and guide members 6 that are disposed between the inclined portions 51c, 52c and the coil springs 4.

The inclined portions 51c, 52c are formed on bottom surface portions of recess portions 51b, 52b into which end portions of the coil springs 4 fit and are inclined in directions in which the inclined portions 51c, 52c move farther away from abutment surfaces 51a, 52a as they extend further radially outwards.

Figure 7A:
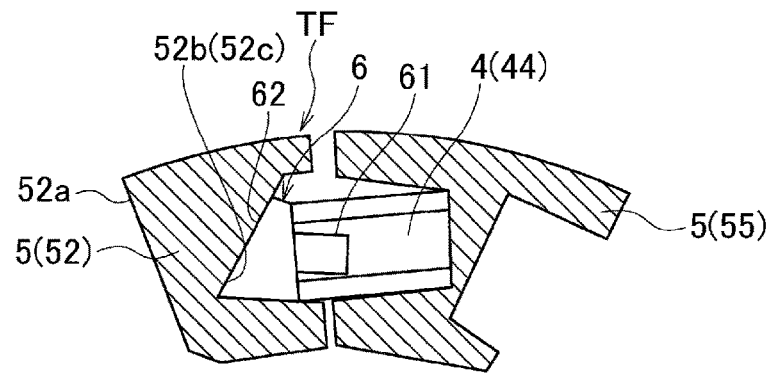
FIGS. 7(a)-7(c) show explanatory diagrams for explaining operations of a force converting mechanism according to the second embodiment of the invention, in which 7(a) is an enlarged front view of a main portion showing a state before a centrifugal force is applied, 7(b) is an enlarged front view of the main portion showing a state in which a guide member slides radially outwards as a result of a centrifugal force being applied, and 7(c) is an enlarged front view of the main portion showing a state in which a spring seat is pressed in a returning direction by an increased reaction force of a coil spring.
Figure 7B:
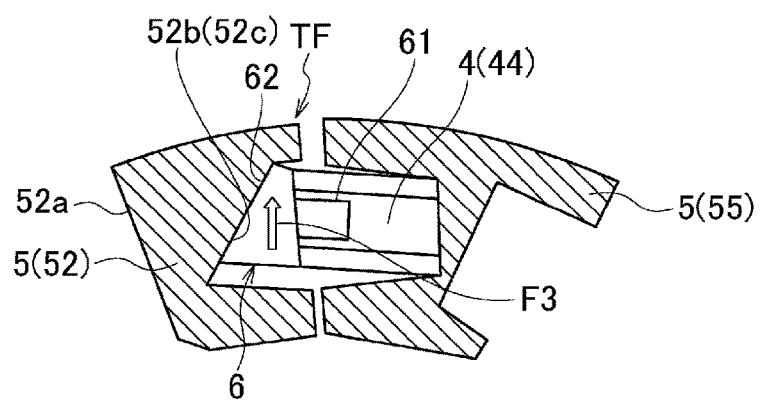
Figure 7C:
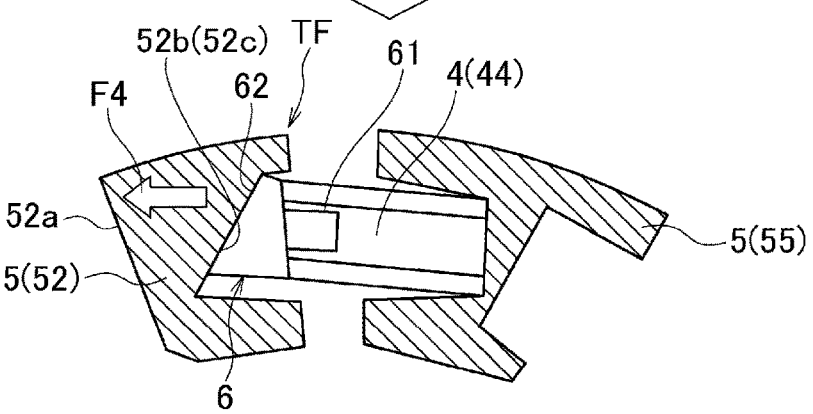

As shown in FIGS. 7(a)-7(c), the guide members 6 have engagement portions 61 which are brought into engagement with the end portions of the coil springs 4 and inclined sliding surfaces 62 which can slide radially along the inclined portions 51c, 52c. For example, as shown in FIGS. 7(a)-7(c), in such a situation that the second spring seat 52 tends to easily stick to the inner circumferential surface 21e of the first flywheel 2 as when the vehicle's state is shifted from the accelerated state to the decelerated state, the guide member 6 slides radially outwards along the inclined portion 52c by a centrifugal force F3 (refer to FIG. 7(b)). When the guide member 6 slides radially outwards along the inclined portion 52c, the guide member 6 is displaced in a direction in which the guide member 6 presses the coil spring 4 to thereby increase the reaction force of the coil spring 4 (refer to FIG. 7(c)). By doing so, the coil spring 4 presses the second spring seat 52 in a restoring direction with the increased reaction force to thereby prevent the sticking of the second spring seat 52.

In such a situation that the first spring seat 51 tends to easily stick to the inner circumferential surface 21e of the first flywheel 2 as when the vehicle's state is shifted from the accelerated state to the decelerated state, the coil spring 4 presses the first spring seat 51 in a restoring direction thereof with the increased reaction force to thereby prevent the sticking of the first spring seat 51.

Thus, as has been described heretofore, according to the dual mass flywheel 1B of this embodiment, the sticking preventing mechanisms TF include the inclined portions 51c, 52c which are formed on the first spring seat 51 and the second spring seat 52, respectively, and the guide members 6 which are disposed between the inclined portions 51c, 52c and the first and fourth coil springs 41, 44. Then, the guide members 6 convert part of the centrifugal force into the force which increases the reaction force of the first and fourth spring coils 41, 44, whereby the sticking of the first spring seat 51 and the second spring seat 52 to the inner circumferential surface 21e of the first flywheel 2 can be prevented.

The invention is not limited to the embodiments which have been described heretofore and hence can be modified or improved as required.

For example, the number of accommodation spaces S that are formed on the first flywheel 2 may be one or three or more.

The number of coil springs 4 that are accommodated in each accommodation space S is not limited to four, and hence, at least one coil spring 4 should be accommodated in the accommodation space S.

In the embodiments, while the invention is described as being applied to the dual mass flywheel that functions as the damper, the invention can be applied not only to the dual mass flywheel but also to other dampers such as a clutch damper.

The invention claimed is:

1. A damper comprising:
a first rotary member, which has a side plate having a disc-shape, a cylindrical portion that is extended in an axial direction from an outer circumferential edge portion of the side plate, and first abutment portions that are provided apart from each other in a circumferential direction;
a second rotary member, which has second abutment portions that are provided apart from each other in the circumferential direction, and which is disposed rotatably relative to the first rotary member;
at least one elastic member that transmits torque between the first rotary member and the second rotary member;
a first seat member, which is disposed between the at least one elastic member, and the first abutment portion and the second abutment portion on a counter-rotating direction side of the first rotary member, and which is configured to slide on an inner circumferential surface of the cylindrical portion as the first rotary member and the second rotary member rotate relatively;
a second seat member, which is disposed between the at least one elastic member, and the first abutment portion and the second abutment portion on a rotating direction side of the first rotary member, and which is configured to slide on the inner circumferential surface of the cylindrical portion as the first rotary member and the second rotary member rotate relatively; and
a sticking preventing mechanism, which converts part of a radially outward force generated by a centrifugal force into a restoring force of the at least one elastic member in the circumferential direction to thereby prevent sticking of the first seat member and the second seat member to the inner circumferential surface, wherein the sticking preventing mechanism is made up of a first diametrically expanded surface in which at least a portion of the inner circumferential surface of the cylindrical portion where the first seat member slidably expands diametrically towards the counter-rotating direction side, and a second diametrically expanded surface in which at least a portion of the inner circumferential surface of the cylindrical portion where the second seat member slidably expands diametrically towards the rotating direction side;
the at least one elastic member includes three or more coil springs that are disposed in series along the circumferential direction;
a third seat member is provided between the coil springs that lie adjacent to each other in the circumferential direction, the third seat member being configured to slide on the inner circumferential surface of the cylindrical portion as the first rotary member and the second rotary member rotate relatively; and
a spring constant of the coil springs that are positioned at circumferential ends is smaller than a spring constant of another coil spring.

2. A damper comprising:
a first rotary member, which has a side plate having a disc-shape, a cylindrical portion that is extended in an axial direction from an outer circumferential edge portion of the side plate, and first abutment portions that are provided apart from each other in a circumferential direction;
a second rotary member, which has second abutment portions that are provided apart from each other in the circumferential direction, and which is disposed rotatably relative to the first rotary member;
at least one elastic member that transmits torque between the first rotary member and the second rotary member;
a first seat member, which is disposed between the at least one elastic member, and the first abutment portions and the second abutment portions on a counter-rotating direction side of the first rotary member, and which is configured to slide on an inner circumferential surface of the cylindrical portion as the first rotary member and the second rotary member rotate relatively;
a second seat member, which is disposed between the at least one elastic member, and the first abutment portions and the second abutment portions on a rotating direction side of the first rotary member, and which is configured to slide on the inner circumferential surface of the cylindrical portion as the first rotary member and the second rotary member rotate relatively; and
a sticking preventing mechanism, which prevents sticking of the first seat member and the second seat member to the inner circumferential surface, wherein
the sticking preventing mechanism is made up of a first diametrically expanded surface in which at least a portion of the inner circumferential surface of the cylindrical portion where the first seat member slidably expands diametrically towards the counter-rotating direction side, and a second diametrically expanded surface in which at least a portion of the inner circumferential surface of the cylindrical portion where the second seat member slidably expands diametrically towards the rotating direction side,
when the first seat member is guided by the first diametrically expanded surface, part of a radially outward force acted on the first seat member generated by a centrifugal force is converted into a restoring force of the elastic member in the circumferential direction, and when the second seat member is guided by the second diametrically expanded surface, part of a radially outward force acted on the second seat member generated by a centrifugal force is converted into a restoring force of the elastic member in the circumferential direction.

3. A damper comprising:
a first rotary member, which has a side plate having a disc-shape, a cylindrical portion that is extended in an axial direction from an outer circumferential edge portion of the side plate, and first abutment portions that are provided apart from each other in a circumferential direction;
a second rotary member, which has second abutment portions that are provided apart from each other in the circumferential direction, and which is disposed rotatably relative to the first rotary member;
at least one elastic member that transmits torque between the first rotary member and the second rotary member;
a first seat member, which is disposed between the at least one elastic member, and the first abutment portion and the second abutment portion on a counter-rotating direction side of the first rotary member, and which is configured to slide on an inner circumferential surface of the cylindrical portion as the first rotary member and the second rotary member rotate relatively;
a second seat member, which is disposed between the at least one elastic member, and the first abutment portion and the second abutment portion on a rotating direction side of the first rotary member, and which is configured to slide on the inner circumferential surface of the cylindrical portion as the first rotary member and the second rotary member rotate relatively; and
a sticking preventing mechanism, which converts part of a radially outward force generated by a centrifugal force into a restoring force of the at least one elastic member in the circumferential direction to thereby prevent sticking of the first seat member and the second seat member to the inner circumferential surface, wherein
the sticking preventing mechanism is made up of a first diametrically expanded surface in which at least a portion of the inner circumferential surface of the cylindrical portion where the first seat member slidably expands diametrically towards the counter-rotating direction side, and a second diametrically expanded surface in which at least a portion of the inner circumferential surface of the cylindrical portion where the second seat member slidably expands diametrically towards the rotating direction side; and
a forming range of the second diametrically expanded surface is wider than a forming range of the first diametrically expanded surface.

\* \* \* \* \*